Aug. 20, 1946.  P. W. GAENSSLE  2,406,212
BRAKE MECHANISM
Filed March 3, 1944  2 Sheets-Sheet 1

INVENTOR.
Paul W. Gaenssle
BY
ATTORNEY

Aug. 20, 1946.  P. W. GAENSSLE  2,406,212
BRAKE MECHANISM
Filed March 3, 1944  2 Sheets-Sheet 2

INVENTOR.
Paul W. Gaenssle
BY
ATTORNEY

Patented Aug. 20, 1946

2,406,212

UNITED STATES PATENT OFFICE 2,406,212

BRAKE MECHANISM

Paul W. Gaenssle, Detroit, Mich., assignor to The Budd Company, Philadelphia, Pa., a corporation of Pennsylvania Application March 3, 1944, Serial No. 524,862

7 Claims. (Cl. 188—153)

The invention relates to a brake mechanism, and more particularly to a fluid-actuated such mechanism in which the actuating means is in large part housed within a closed casing.

The invention is more particularly concerned with the type of brake shown in copending application, Serial No. 399,779, filed June 26, 1941, in which a brake rotor is mounted to rotate with a wheel of a wheel and axle assembly supporting a vehicle frame, and a pair of brake stators are arranged to operatively engage the opposite faces of said rotor, and the brake stators and their actuating means are supported by a U- or C- frame, which has its ends supported from the wheel and axle assembly and its intermediate portion from the vehicle frame. The support frame is enlarged in the region of a brake rotor to form a housing enclosing most of the brake cylinder and the actuating levers connecting the cylinder with the brake stators.

It is an object of the invention to generally simplify and improve such a brake support, to lighten its weight and to render the parts more readily fabricated, as well as more accessible at all times for replacement or repair.

It is a further object of the invention to provide a construction in which the brake cylinder housing together with the brake levers carried thereby may be readily assembled and disassembled with the brake supporting yoke as a unit, and without disrupting the yoke support.

The cylinder is arranged laterally offset from the yoke, so that its ends are accessible, and removable end closures thereon can be removed at any time to afford access to the inside of the cylinders. The arms of the brake levers cooperating with the cylinders and extending within the closed housing are preferably demountable from the pivot portions of the levers, and a removable cover is provided for the housing through which these arms can be assembled or disassembled with their pivot portions and the associated cylinder.

The brake levers preferably have one of their arms, extending without the housing for cooperation with a respective stator or shoe, made integral with fulcrum portions on opposite sides thereof, which fulcrum portions are adapted to engage, respectively, spaced aligned bearings, one carried by the yoke support proper and the other by the demountable cylinder housing.

Other and further objects and advantages and the manner in which they are attained will become evident from the following detailed description when read in connection with the drawings forming a part of this specification.

Figure 1:
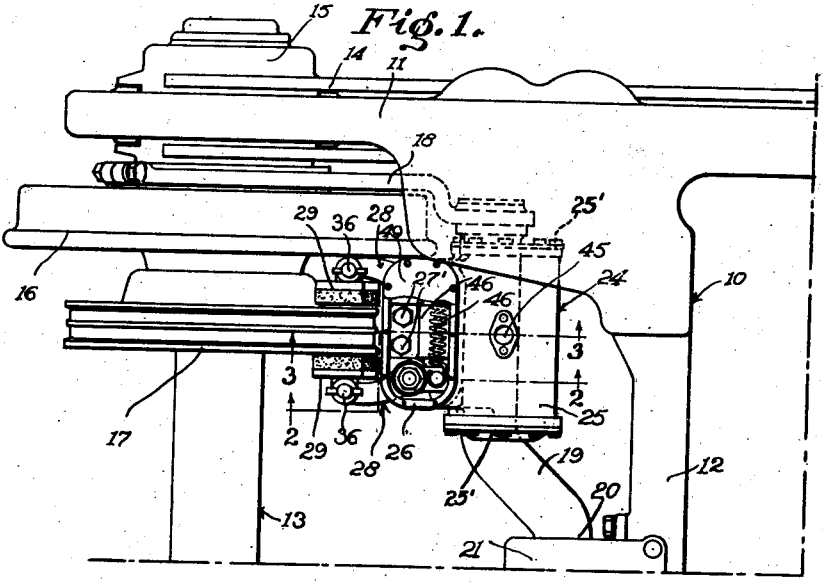
Fig. 1 is a plan view of one-quarter of a railway truck showing the invention applied thereto.

The invention has been applied in the form shown to a brake mechanism for a railway vehicle, such as a railway truck, the frame of which is designated generally by numeral 10 and comprises the usual side frames, as 11, and transoms, as 12, interconnecting them. The ends of the side frames are supported in a usual manner from the wheel and axle assemblies, as 13, through the equalizer bars, as 14, resting on top of the associated journal boxes, as 15, of the wheel and axle assemblies.

The wheel and axle assemblies comprise the spaced wheels, as 16, arranged inside the adjacent journal boxes and with each wheel is associated a brake rotor, such as the brake disc 17, bolted to the adjacent wheel hub.

To support the brake mechanism cooperating with the respective brake rotors, a brake support yoke or frame of substantially U- or C- form is provided, this yoke or frame having longitudinally extending end members, as 18, supported from the wheel and axle assembly and a transverse tubular member, as 19, interconnecting the longitudinally extending members 18. The central portion 20 of the member 19 is offset toward the adjacent transom 12, and is there supported by a bracket 21 secured to the transom in a manner similar to that disclosed in the copending application referred to.

Figure 2:
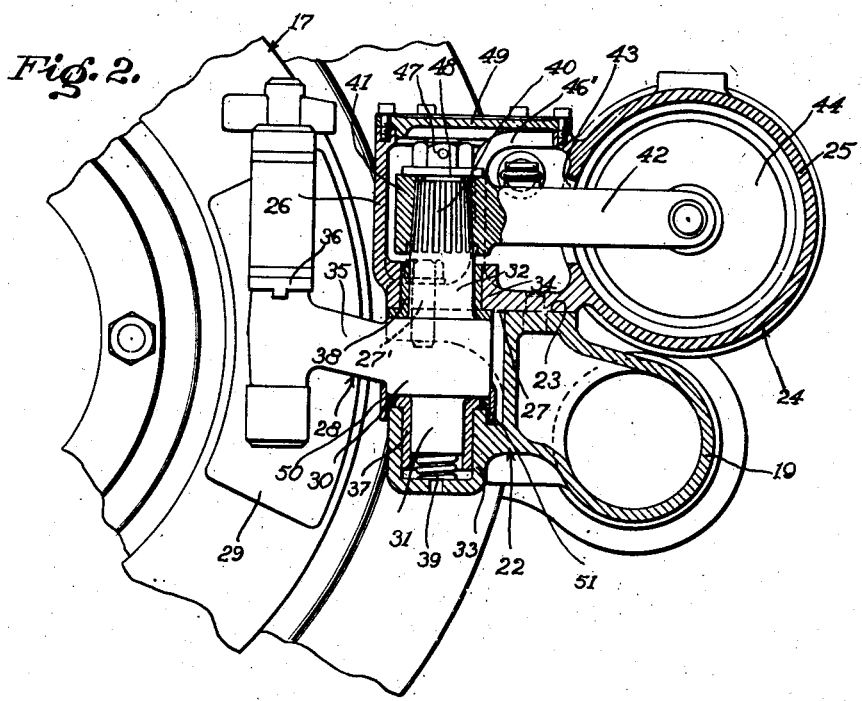
Fig. 2 is an enlarged detail sectional view, the section being taken substantially along the line 2—2 of Fig. 1.
Figure 3:
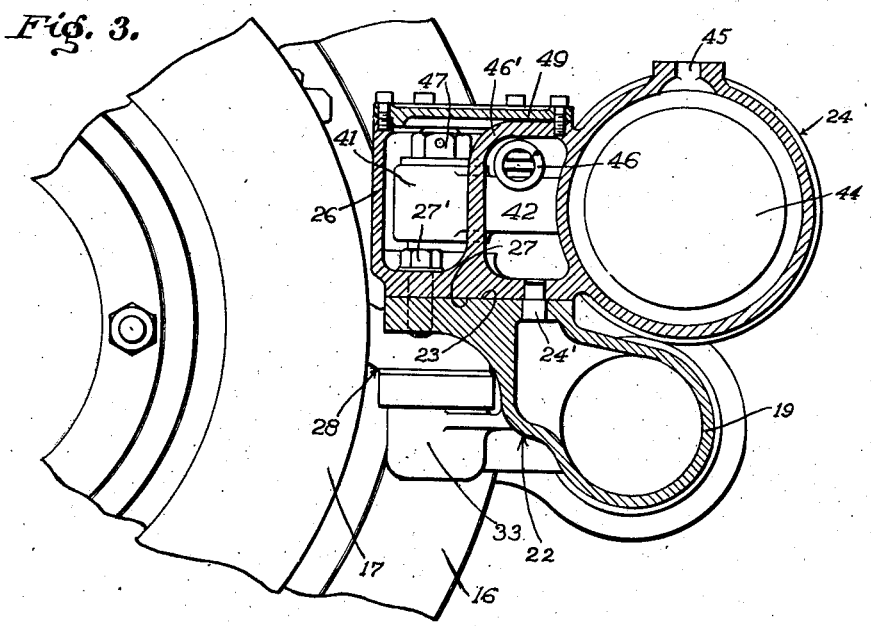
Fig. 3 is a similar sectional view, the section being taken substantially along the line 3—3 of Fig. 1.

In the form shown in Figs. 1 to 3, the tubular member 19 is formed, in the region of the rotary brake disc 17, with an integral bracket 22 extending toward the disc 17 and formed with a flat seating face 23 arranged in a generally horizontal plane disposed above the body of the tubular member 19.

A brake cylinder housing, designated generally by the numeral 24, and comprising a brake cylinder 25 and a lateral extension 26 therefrom, is demountably secured through a mating seat 27 on the lateral extension 26 to the seat 23 on the bracket 22. A dowel pin 24' and a pair of securing bolts 27' serve to locate and secure the cylinder housing on the support bracket. The cylinder 25 so mounted is laterally, i. e. vertically, offset from the tubular support member 19 and can have its ends closed by removable end covers, as 25', so that access to the cylinder interior can be readily had at all times by removing one or both of said covers.

According to the invention, the brake levers, as 28, are pivoted in laterally spaced relation, one cooperating with each brake stator or shoe, as 29, arranged in cooperative relation with the opposite faces of said rotor or disc 17.

Each brake lever comprises an enlarged central hub portion 30 from which project in opposite directions the integral fulcrum portions 31 and 32, these fulcrum portions being mounted in aligned bearings 33 and 34, located, respectively, in the bracket 22 integral with the tubular member 19 and in the cylinder housing extension 26. An integral arm 35 extends from the hub 30 and pivotally supports the associated shoe 29 as indicated at 36.

The bearings 33 and 34 are preferably lined, as shown, with flanged wear resisting bearing sleeves 37 and 38, respectively, to take the radial and end thrusts from the associated lever. To avoid any endwise play, a spring 39 may be inserted between the bottom of the cup bearing 33 and the adjacent end of the fulcrum 31.

The upper fulcrum 32 is extended into the housing extension 26 by a tapered portion 40 which is splined, as shown, and interlocked with a correspondingly splined and tapered bore in the hub portion 41 of the lever arm 42 which extends through a wide slot 43 in the cylinder wall and has its end in abutting relation to the actuating piston 44 sliding within the cylinder.

It will be understood that two such pistons are employed, one for actuating each lever, and that fluid under pressure is admitted between the pistons through the port 45 in a usual manner, to force the pistons apart, and swing the levers 28 about their pivots to apply the shoes into braking engagement with the disc.

The lever arms 42 of the two levers are interconnected by a coiled tension spring 46 to bring the parts to inoperative position upon release of the fluid pressure in the cylinder. This spring extends under a curved wall 46' bracing the top and bottom walls of the extension 26 and disposed between the lever arms 42 of the respective levers.

The arm 42 of each lever is secured in place by a nut 47 and washer 48, the nut being screwed onto a reduced screw threaded end of the splined extension 40 of the fulcrum 32. The nut may be locked in any suitable position, as by a cotter pin.

To provide access to the parts within the extension 26 its top is provided with an opening normally closed by a removable cover 49, bolted in place. When the cover 49 is removed, the bolts 27' may be released, and the cylinder housing 24, brake levers 28 and attached shoes 29 may be lifted as a unit off the integral bracket 22 of the tubular support member 19, this removal as a unit being made possible by the slip connection between the fulcrum portion 31 and the bearing 33 carried by the integral bracket 22.

On the other hand, the bolts 27' need not be disturbed, if it is desired merely to remove the arms 42 or to obtain access thereto for other reasons. The arms 42 can be readily removed or replaced through the opening normally closed by the cover 49 when the latter is removed. With the arms 42 removed, the pistons 44 can be withdrawn through one or the other of the open ends of the cylinder 25, the end covers 26 having been removed.

It will be noted from the foregoing that the arrangement combines great simplicity with easy accessibility for replacement or repair while maintaining most of the parts normally within a sealed housing free from entering dirt and water.

To provide a proper seal for the lower bearing 33 the hub portion 30 of a brake lever 28 may be provided with a depending skirt 50 extending down over the upper end of the bearing 33 and between this skirt and bearing may be inserted a suitably sealing gasket, as 51.

Figure 4:
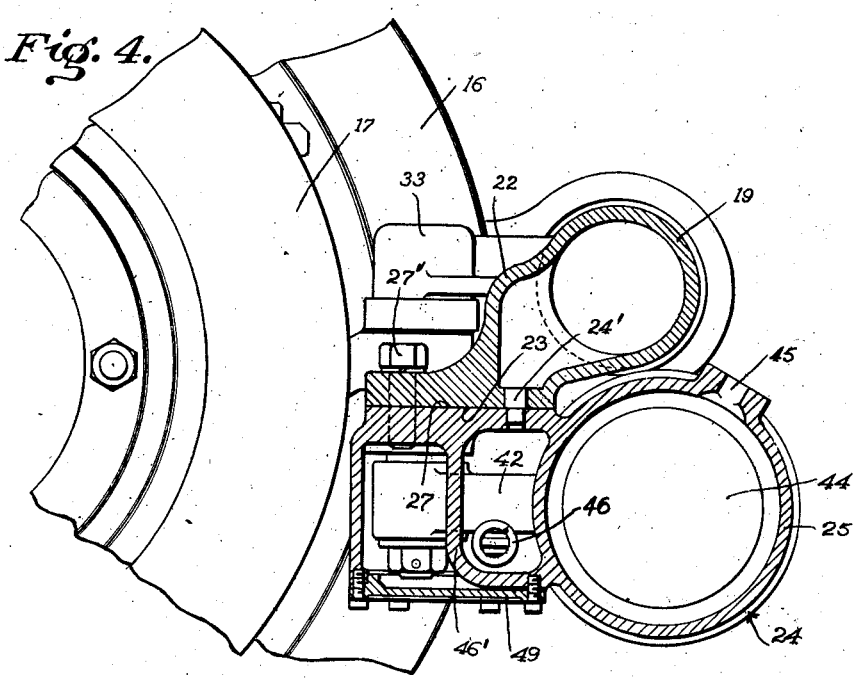
Fig. 4 is a view similar to Fig. 3 showing a slight modification.

According to the modification of Fig. 4, the arrangement is reversed, in that the transverse tubular member 19 is on top, and the mating surfaces 23 and 27 are arranged in a plane below said member. The arrangement of parts is otherwise substantially the same as in the preferred form. With this arrangement the bolts 27' holding the cylinder housing unit and the integral bracket 22 together are accessible from the outside, so that the cylinder housing unit with all the parts associated therewith may be removed without first removing the cover 49. Of course, it will be understood that the bolts 27 in the preferred form might be reversed, so that they could also be removed from the outside, without removing the cover 49.

While several preferred embodiments of the invention have been herein described in the foregoing detailed description, it will be understood that changes and modifications may be made without departing from the main features of the invention, and such changes and modifications are intended to be covered in the apended claims.

What is claimed is:

1. In a brake mechanism, a rotary brake member, a brake supporting member extending transversely adjacent the periphery of said rotary member, a seat on said support member opposite said rotary member, a brake cylinder housing removably supported on said seat, spaced aligned bearings disposed, respectively, on said support member and said brake cylinder housing, a brake lever pivotally mounted through journal portions thereon engaging the respective bearings, said lever having an arm disposed intermediate the bearings and adapted to operatively engage a non-rotary brake member disposed in cooperative relation with said rotary member and having another arm extending within said housing into cooperative relation with a brake cylinder therein.

2. In a brake mechanism, a rotary brake member, a brake supporting member extending transversely adjacent the periphery of said rotary member, a seat on said support member opposite said rotary member, a brake cylinder housing comprising a cylinder offset from said support member and a lateral extension from said cylinder removably mounted on said seat, spaced aligned bearings disposed, respectively, on the support member and said lateral extension, a brake lever pivotally mounted through journal portions thereon engaging the respective bearings, said lever having an arm extending outside the housing and adapted to operatively engage a non-rotary brake member disposed in cooperative relation with said rotary member and having another arm extending within said brake cylinder, said lateral extension of the brake cylinder housing being provided with an opening in the wall thereof opposite said bearing, and a removable cover normally closing said opening.

3. In a brake mechanism, a rotary brake member, a brake supporting member extending transversely adjacent the periphery of said rotary member, a seat on said support member opposite said rotary member, a brake cylinder housing comprising a cylinder offset from said support member so as to have both ends of the cylinder for some distance laterally of said ends freely spaced from said support member and a lateral extension from the cylinder having a bearing for mounting one end of a brake lever pivot and being removably mounted on said seat, the other end of said brake lever pivot having a bearing in said brake supporting member said cylinder being open at its opposite ends, and removable closures for said openings removable while the cylinder is mounted on the support member.

4. In a brake mechanism, a rotary brake member, a brake supporting member extending transversely adjacent the periphery of said rotary member, a seat on said support member opposite said rotary member, a brake cylinder housing having a mating seat removably mounted on the seat of said support member, and a brake lever pivotally mounted in part on said support member and in part on said cylinder housing, the mounting on said support member having a slip connection permitting the removal of the cylinder housing and the brake lever as a unit from the support member.

5. In a brake mechanism, a rotary brake member, a brake supporting member extending transversely adjacent the periphery of said rotary member, a seat on said support member opposite said rotary member, a brake cylinder housing comprising a freely extending cylinder offset from said support member and a lateral extension therefrom having a mating seat removably mounted on the seat of said support member, and a brake lever being pivotally mounted in part on said lateral extension and in part and by a slip connection on said support member, whereby the brake cylinder housing and the brake lever may be removed as a unit from said support member.

6. In a brake mechanism, a wheel and axle assembly, a vehicle frame supported thereby, a brake disc mounted to rotate with a wheel of said assembly, a brake supporting frame having its ends supported from the wheel and axle assembly and its intermediate portion from the frame, a seat on said frame opposite said disc, a brake cylinder housing removably supported on said seat, brake shoes operatively associated with the opposite faces of said disc, and brake levers operatively interconnecting the respective shoes with a brake cylinder in said housing, said brake levers each having thrust and radial bearing support on both said frame and said cylinder housing.

7. In a brake mechanism, a wheel and axle assembly, a vehicle frame supported thereby, a brake rotor mounted to rotate with a wheel of said assembly, a pair of brake stators arranged to operatively engage the opposite faces of said rotor, and a yoke support for said stators supported at its ends from said assembly and intermediate its ends from said frame, said yoke having a generally horizontal seat thereon, a cylinder housing having a portion mating said seat and demountably secured thereto, and brake levers cooperating with the respective shoes and with a brake cylinder within the housing, said levers each having spaced journal portions engaging, respectively, a bearing on said yoke and a bearing on the cylinder housing, the arrangement being such that the brake cylinder housing with the brake levers may be removed as a unit from said support.

PAUL W. GAENSSLE.